US012605601B1

(12) United States Patent
Howell

(10) Patent No.: US 12,605,601 B1
(45) Date of Patent: Apr. 21, 2026

(54) GOLF POSITIONING AND RETRIEVING DEVICE

(71) Applicant: Ben Howell, Gastonia, NC (US)

(72) Inventor: Ben Howell, Gastonia, NC (US)

( * ) Notice: Subject to any disclaimer, the term of this patent is extended or adjusted under 35 U.S.C. 154(b) by 0 days.

(21) Appl. No.: 19/372,520

(22) Filed: Oct. 29, 2025

(51) Int. Cl.
    *A63B 57/00* (2015.01)
    *A63B 47/02* (2006.01)
    *B25J 1/04* (2006.01)

(52) U.S. Cl.
    CPC .......... *A63B 57/0037* (2013.01); *A63B 47/02* (2013.01); *B25J 1/04* (2013.01)

(58) Field of Classification Search
    CPC .... A63B 57/0037; A63B 57/20; A63B 57/203
    See application file for complete search history.

(56) References Cited

U.S. PATENT DOCUMENTS

| | | | | |
|---|---|---|---|---|
| 4,013,295 A | * | 3/1977 | Baughman | A63B 57/0037 473/286 |
| 4,949,961 A | * | 8/1990 | Milano | A63B 47/02 473/133 |
| 5,335,953 A | * | 8/1994 | Luther, Sr. | A63B 47/02 294/99.1 |
| 6,672,977 B1 | * | 1/2004 | Colbo | A63B 47/02 294/19.2 |
| 2016/0258572 A1 | * | 9/2016 | Ben Meir | G03B 17/561 |

* cited by examiner

*Primary Examiner* — Brian O Peters
(74) *Attorney, Agent, or Firm* — Ashley D. Johnson; Dogwood Patent and Trademark Law

(57) ABSTRACT

The invention is a golf positioning and retrieving device. The device includes a housing comprising a movable carrier, a biasing member coupled to the carrier, and a pair of opposed spoons pivotably connected to the carrier. The spoons include an open configuration and a closed configuration to selectively grasp or release an object, such as a golf ball and/or golf tee. A handle coupled to the housing includes a pair of triggers operatively connected to the carrier such that actuation of the trigger displaces the carrier against the biasing member, thereby moving the spoons between configurations. The device further includes a tripod selectively deployable by the second trigger to support the device in a freestanding orientation. The device allows a user to position a tee and ball, retrieve a ball from the ground or a cup, and remove a tee, without bending or stooping.

20 Claims, 12 Drawing Sheets

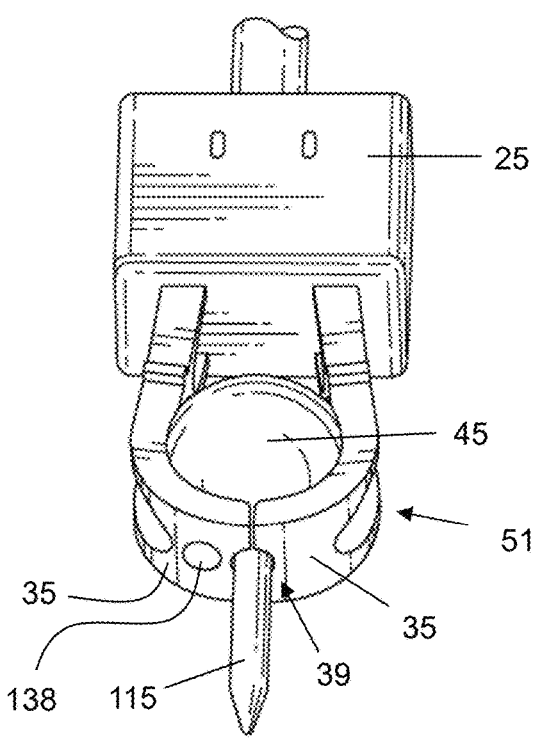
Fig. 4b
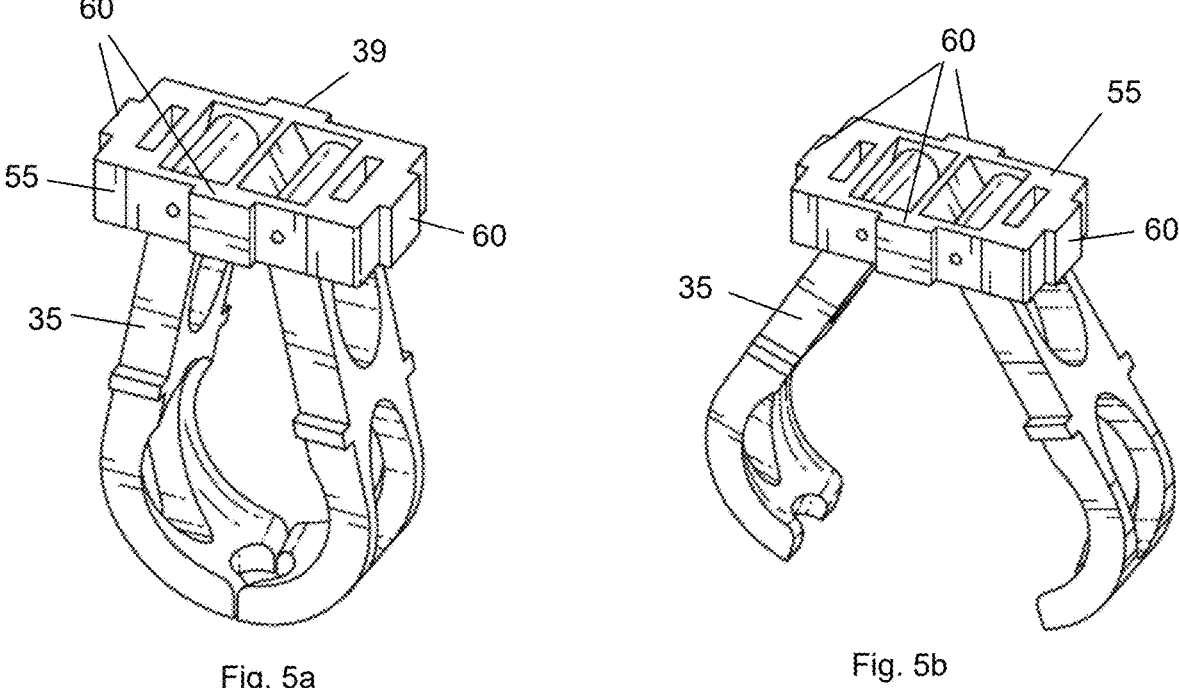
Fig. 5a                                Fig. 5b

55 — 70

101        101

100        100

101        101

100        100

101        100        101

65

55

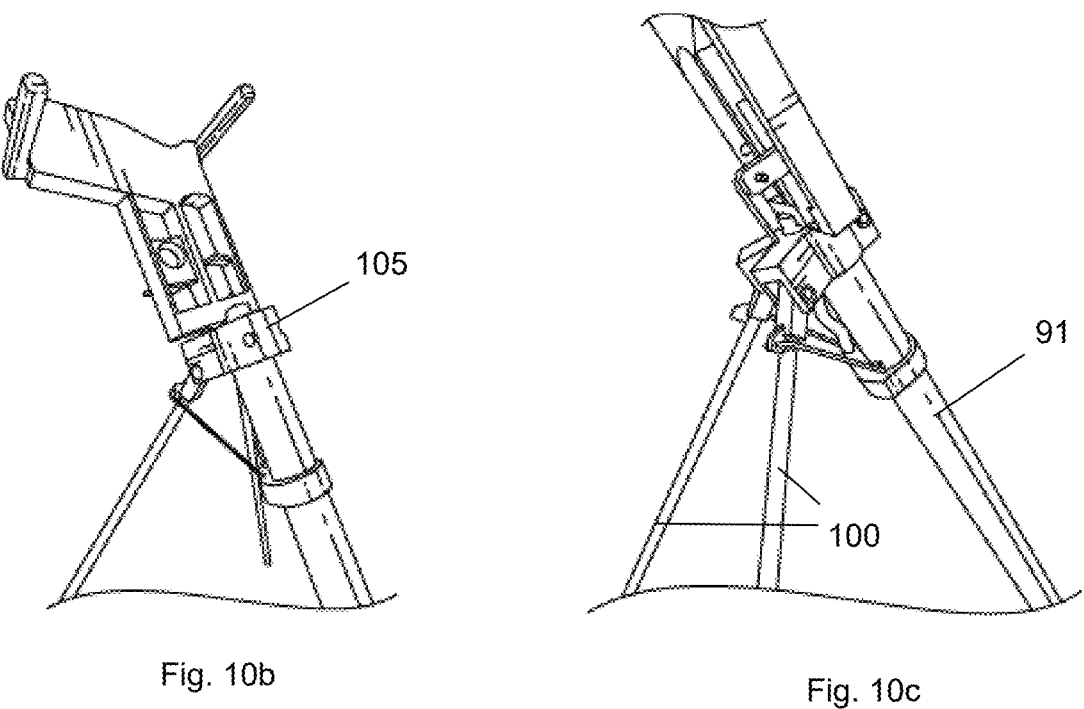
Fig. 10b
Fig. 10c
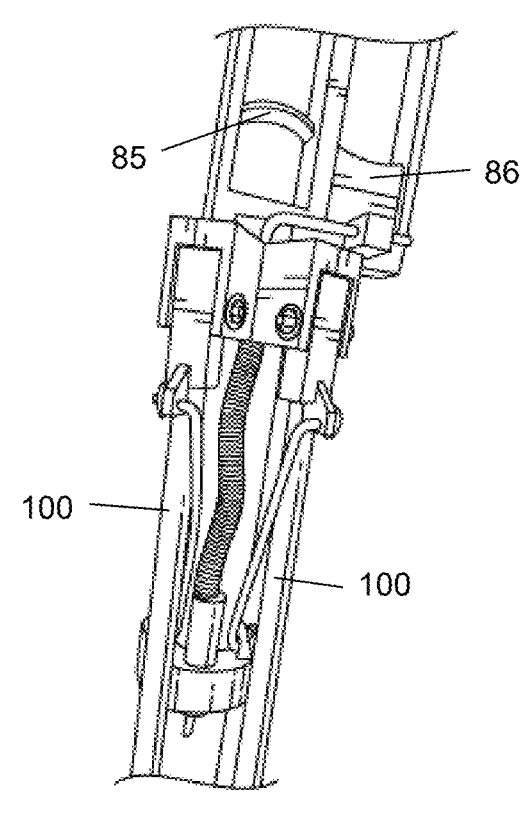
Fig. 10d

100

105

100

105

GOLF POSITIONING AND RETRIEVING DEVICE

FIELD OF THE INVENTION

The presently disclosed subject matter relates to a golf accessory and methods making and using the golf accessory. Specifically, the golf accessory is a device for implanting and retrieving a golf tee and/or golf ball in the ground without bending over.

BACKGROUND OF THE INVENTION

Golf is one of the most popular recreational and competitive sports worldwide, enjoyed by millions of participants across a wide range of ages and abilities. The game of golf typically requires repeated bending and stooping motions, such as when placing a golf ball on a tee, retrieving a golf ball from the ground or from a cup, and/or positioning and removing a tee. While these motions may be easily performed by younger or physically agile players, they can present inconvenience or physical difficulty for others, particularly older players or those with back, hip, or joint limitations. The necessity for frequent bending may reduce enjoyment of the game, increase fatigue, and in some cases discourage continued participation. Accordingly, it would be desirable to provide a device that assists the player in performing common golf-related tasks (such as teeing a ball and retrieving a ball from the ground) without requiring the player to repeatedly bend or stoop to ground level. Advantageously, a device of this type would improve comfort, reduce physical strain, and extend accessibility of the game to a broader population of players.

SUMMARY OF THE INVENTION

In some embodiments, the presently disclosed subject matter is directed to a golf positioning and retrieving device. Specifically, the device comprises a head defined by a housing comprising a top face, bottom face, and interior. The head also includes a carrier disposed within the housing interior and movable along a vertical path via one or more tracks disposed within the housing interior. "Vertical" refers to a direction or orientation that is substantially aligned with the force of gravity, extending up and down relative to the horizon or ground plane. The head comprises a biasing member disposed within the housing interior adjacent to the housing top face and configured to urge the carrier toward a rest position. The device includes a pair of opposed spoons coupled to the carrier and extending from the bottom face of the housing, the spoons being pivotable between an open configuration and a closed configuration to selectively grasp and release an object (e.g., golf ball and/or golf tee). The device includes a handle coupled to the housing, the handle comprising a first trigger. The first trigger is operatively connected to the biasing member such that actuation of the first trigger displaces the carrier against the biasing member, thereby moving the spoons from the open configuration to the closed configuration. Actuation is the process of causing a device, mechanism, or component to operate or move, typically by applying a force, signal, or control input.

The term "biasing member" refers to any element configured to exert a force that urges another component of the device toward a predetermined position. For example, a biasing member (such as a coil spring) can be positioned within a housing to apply a downward force on the carrier, thereby maintaining the spoons in a default configuration.

The biasing member may take various forms, including (but not limited to) coil springs, leaf springs, elastomeric elements, pneumatic elements, and/or magnetic biasing elements. The biasing member functions to store potential energy when displaced from its rest condition and to release that energy to return the carrier and spoons toward their default orientation when actuation is released.

As used herein, the term "trigger" refers to a manually operable control member configured to be engaged by a user's finger or hand to initiate actuation of a mechanism within the device. The geometry of the trigger may include a lever, button, or pull surface, and may be designed for single-finger operation while the remaining fingers stabilize the device.

In some embodiments, the spoons include facing indentations that cooperate in the closed configuration to define a cavity for retaining a golf tee.

The term "golf tee" refers to an elongated support member having a lower portion configured for insertion into the ground and an upper portion configured to support a golf ball. The upper portion may include a concave, convex, flat, or otherwise shaped surface capable of retaining the ball in a stable position prior to striking a shot. Golf tees may be constructed from wood, polymeric material, biodegradable material, composite, and/or other suitable materials. In some embodiments, the indentations of the spoons are shaped to engage a neck region of the golf tee to securely retain the tee during positioning, insertion, or retrieval.

In some embodiments, the spoons include curved inner surfaces shaped to conform to an outer curvature of a golf ball. The "outer curvature of a golf ball" refers to the spherical contour defined by the exterior surface of a standard golf ball, including any dimple pattern or surface texturing. The curvature corresponds to the ball's nominal diameter (approximately 1.68 inches for a regulation golf ball) and defines the arc against which complementary structures of the device (such as the inner surfaces of the spoons) are shaped. By conforming to the outer curvature of the golf ball, the spoons are configured to cradle and retain the ball securely in the closed configuration while minimizing the risk of slippage or unintentional release.

In some embodiments, each spoon includes a cutout sized and shaped to accommodate a golf ball. As used herein, the term "cutout" refers to a recessed or removed portion formed in a component (such as the carrier or housing) that defines a space, notch, or channel configured to interact with another component. In the disclosed device, cutouts may be provided to guide, limit, or control the motion of the spoons. The geometry of the cutouts establishes angular displacement limits, defines travel stops, and ensures that the spoons transition between open and closed positions in a controlled and repeatable manner. A cutout may be linear, curved, angled, or otherwise contoured, and may be dimensioned according to the desired range of motion or operational constraints of the device.

In some embodiments, at least one of the spoons includes a magnet configured to attract and retain a metallic item. As used herein, the term "metallic item" refers to an object constructed wholly or partially of a metal or metal alloy, or otherwise containing a metallic portion sufficient to interact with a magnet or other metallic-attractive element of the device. Examples include (without limitation) golf ball markers, coins, tees with metallic components, and/or accessories incorporating metal. In some embodiments, the metallic item is ferromagnetic such that it is attractable to a permanent or rare earth magnet disposed on the spoons. In other embodiments, the metallic item may include non-ferrous metals or alloys while still being carried, retained, or stored by the device.

In some embodiments, the device further includes a tripod assembly coupled to the handle and selectively deployable through actuation of a second trigger to selectively deploy and retract tripod legs. The term "tripod" refers to a support assembly comprising two legs or leg-like members that extend from a central shaft, collar, or housing to form a stable base capable of supporting the device in a freestanding, upright orientation. The tripod legs are selectively movable between a stowed configuration adjacent to the shaft and a deployed configuration in which the legs pivot outward to contact a support surface. The geometry and angular displacement of the tripod legs define a footprint that stabilizes the device and may additionally support external items, such as golf clubs or a flag pin, leaned against the device.

In some embodiments, the carrier includes ridges configured to engage guide tracks within the housing, the guide tracks maintaining the carrier in a level orientation during movement. The term "level orientation" refers to the condition in which a component (such as the carrier) is maintained in a substantially parallel relationship relative to a reference surface or plane of the housing, such that the component remains flat and evenly aligned during movement. In the disclosed device, guide tracks are configured to maintain the carrier in a level orientation as it moves vertically within the housing, thereby preventing tilting or uneven pivoting of the spoons and ensuring consistent grasping and releasing action.

In some embodiments, the carrier includes cutouts configured to limit angular displacement of the spoons relative to the carrier. "Angular displacement" refers to the rotation of a component about a pivot or axis relative to a reference position. For example, when spoons of the disclosed device pivot about their connection to the carrier, the amount of rotation between the open configuration and the closed configuration defines the angular displacement of the spoons. Angular displacement may be limited or guided by cutouts, stops, or other features to ensure controlled movement within a predetermined angular range.

In some embodiments, the handle includes a grip portion sized to permit actuation of the first trigger by a single finger while the remaining fingers stabilize the device.

In some embodiments, the spoons are shaped such that, in the closed configuration, an upper surface of a golf ball engaged by the spoons is positioned in contact with a bottom face of the housing.

In some embodiments, the device is dimensioned and configured for use in positioning and retrieving objects other than golf balls, including sports balls, markers, toys, tees, or debris.

In some embodiments, the presently disclosed subject matter is directed to a method of positioning and retrieving a golf ball and tee without bending (e.g., the user is not required to bend over or stoop and can remain in an upright or standing position). The method includes actuating the first trigger of the disclosed device to compress the biasing member and displace the carrier within the housing, thereby pivoting the spoons into a closed configuration to simultaneously grasp a golf ball and a golf tee. The method includes positioning the tee in the ground while maintaining the golf ball seated on the tee. The method includes releasing the first trigger to permit the spoons to return to an open configuration.

As used herein, the term "compress" refers to the act of applying a load or force to a spring or other biasing member such that the spring is displaced from its rest state into a shortened or otherwise deformed condition, thereby storing potential energy. In the case of a coil spring, compression reduces the distance between adjacent coils. In the case of other biasing members (e.g., elastomeric, leaf, pneumatic, or magnetic), compression similarly denotes the reduction of length, deflection, or free volume under an applied load. Upon release of the load, the spring returns toward its original, elongated configuration and releases the stored energy.

As used herein, the term "grasp" refers to the act of enclosing, retaining, or securing an object between two or more opposing surfaces such that the object is held against movement or displacement. In the context of the disclosed device, "grasp" encompasses the action of the spoons moving toward one another into a closed configuration to engage and retain an item (such as a golf ball or golf tee) within the interior space defined between the spoons.

In some embodiments, the method includes using the spoons in the closed configuration to remove a golf ball from a golf cup. The term "golf cup" refers to the hole on the putting green into which the golf ball must be played. Standard dimensions of a golf cup include a diameter of 4.5 inches and a depth of at least 4 inches. The golf cup can include a cup insert typically sunk at least one inch below the putting surface to ensure the ball can completely fall below the lip of the green.

In some embodiments, the method includes using the spoons in the closed configuration to remove a tee from the ground after striking a shot. The phrase "striking a shot" refers to the act of intentionally hitting a golf ball sitting on a top surface of a golf tee with a club to advance the ball towards the hole. Thus, when striking a shot, the player makes contact with the ball via a club and the ball is propelled.

In some embodiments, the method includes actuating the second trigger to deploy the tripod, thereby supporting the device in a freestanding upright orientation.

In some embodiments, actuating the first trigger comprises pulling the trigger with a single finger while stabilizing the device with remaining fingers of the same hand.

In some embodiments, the step of positioning the tee in the ground includes transferring insertion load through the housing rather than through the spoons.

In some embodiments, in the closed configuration, an upper surface of a golf ball engaged by the spoons is positioned in contact with a bottom face of the housing.

BRIEF DESCRIPTION OF THE DRAWINGS

FIG. 4b is a perspective view of a pair of device spoons in use in accordance with some embodiments of the presently disclosed subject matter.

FIG. 5a is a perspective view of a pair of device spoons and associated carrier in a closed configuration in accordance with some embodiments of the presently disclosed subject matter.

FIG. 5b is a perspective view of the spoons and carrier of FIG. 5b in an open configuration in accordance with some embodiments of the presently disclosed subject matter.

FIGS. 10b-10f are perspective views of the device tripod in an open configuration in accordance with some embodiments of the presently disclosed subject matter.

DETAILED DESCRIPTION OF THE INVENTION

Figure 1:
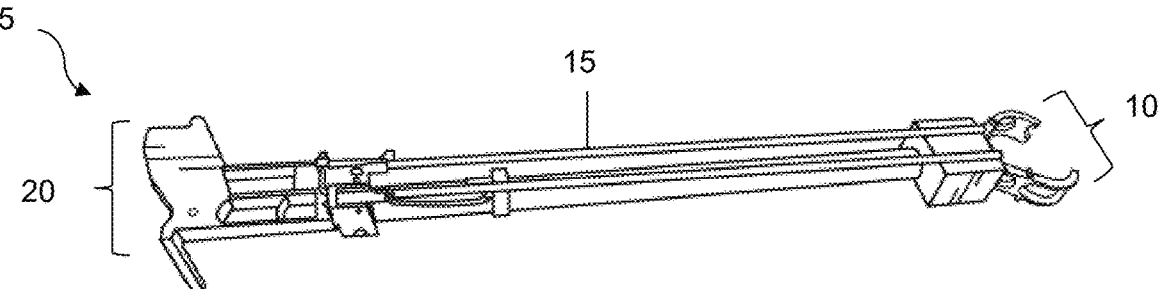
FIG. 1 is a perspective view of a golf positioning and retrieving device in accordance with some embodiments of the presently disclosed subject matter.

For the purpose of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e., at least one) of the grammatical object of the article. By way of example, "an element" means at least one element and can include more than one element. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about." Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments+/−20%, in some embodiments+/−10%, in some embodiments+/−5%, in some embodiments+/−1%, in some embodiments+/−0.5%, and in some embodiments +/−0.1%, from the specified amount, as such variations are appropriate in the disclosed packages and methods. Thus, the term "about" is used to provide flexibility to a numerical range endpoint by providing that a given value may be "slightly above" or "slightly below" the endpoint without affecting the desired result.

As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

All methods described herein can be performed in any suitable order unless otherwise indicated herein or otherwise clearly contradicted by context. The use of any and all examples, or exemplary language (e.g., "such as") provided herein, is intended merely to better illuminate the invention, and does not pose a limitation on the scope of the invention unless otherwise claimed. No language in the specification should be construed as indicating any unclaimed element as essential to the practice of the invention.

Unless otherwise defined, all technical terms used herein have the same meaning as commonly understood by one of ordinary skill in the art to which this disclosure belongs.

The presently disclosed subject matter relates to a device that enables a user to position and retrieve an item (such as a golf ball and/or golf tee) without the need to bend or stoop. As shown in FIG. 1, retrieval device 5 includes lower head 10 configured for controlled insertion and removal of a golf tee and associated golf ball into or from the ground or other surface. The device further includes handle 20 at an upper end, the handle comprising a pair of triggers operatively connected to the head and an associated tripod 15. As described in detail below, the head includes a pair of opposed spoons that separate and close to perform a grasping action coordinated with shortening and elongation of the device. In this manner, the device provides a kinetic motion that simulates natural hand movement. Advantageously, the tee and ball may be controlled using a single hand by gripping handle 20 and actuating one or both of the triggers with a finger.

Figures 2A, 2B:
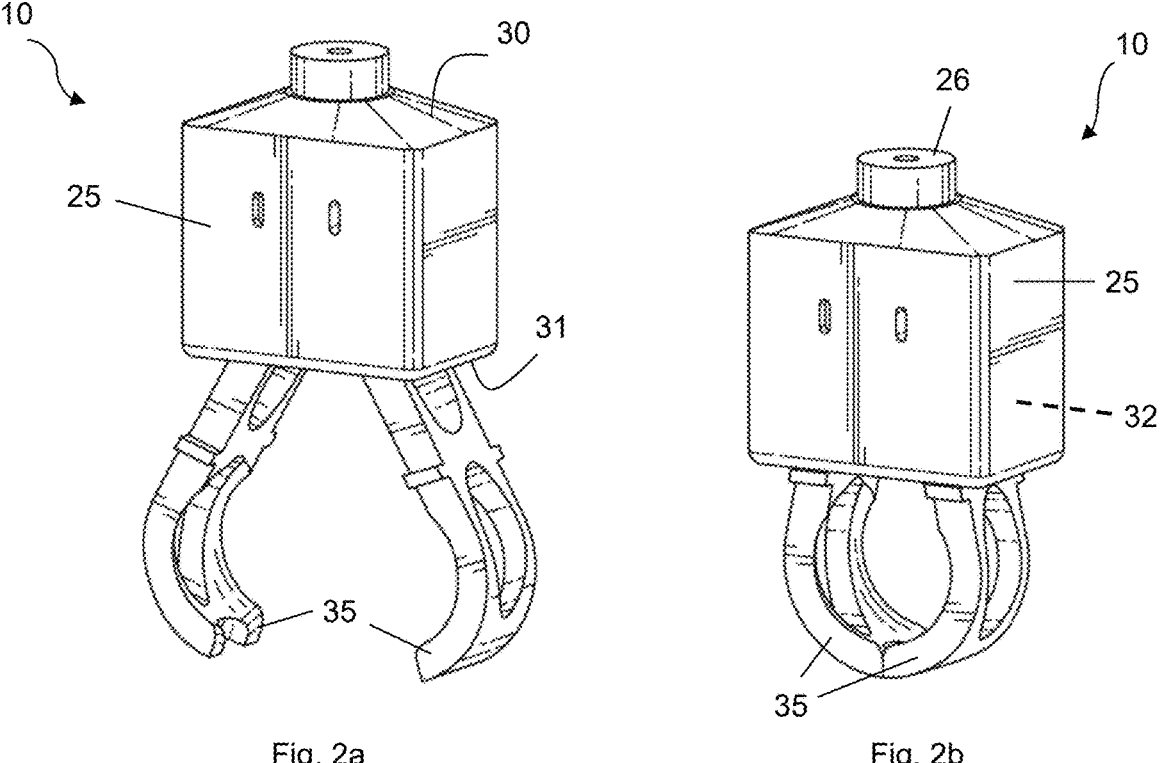
FIG. 2a is a perspective view of a device head defined by two spoons in a first, open configuration in accordance with some embodiments of the presently disclosed subject matter.
FIG. 2b is a perspective view of the device head of FIG. 2a in a second, closed configuration in accordance with some embodiments of the presently disclosed subject matter.

One embodiment of device head 10 is illustrated in FIGS. 2a and 2b. As shown, the device head includes housing 25 having a top face 30 and an opposed bottom face 31. The housing defines an interior 32 configured to retain one or more mechanical components for producing a grasping and releasing motion of the device. The top face can include enclosure 26 that accommodates a biasing element or other actuator (e.g., spring) operably coupled to a moveable carrier to facilitate a grasping and releasing motion. The housing can be constructed in any of a variety of sizes and shapes.

Figures 3A, 3B, 4A:
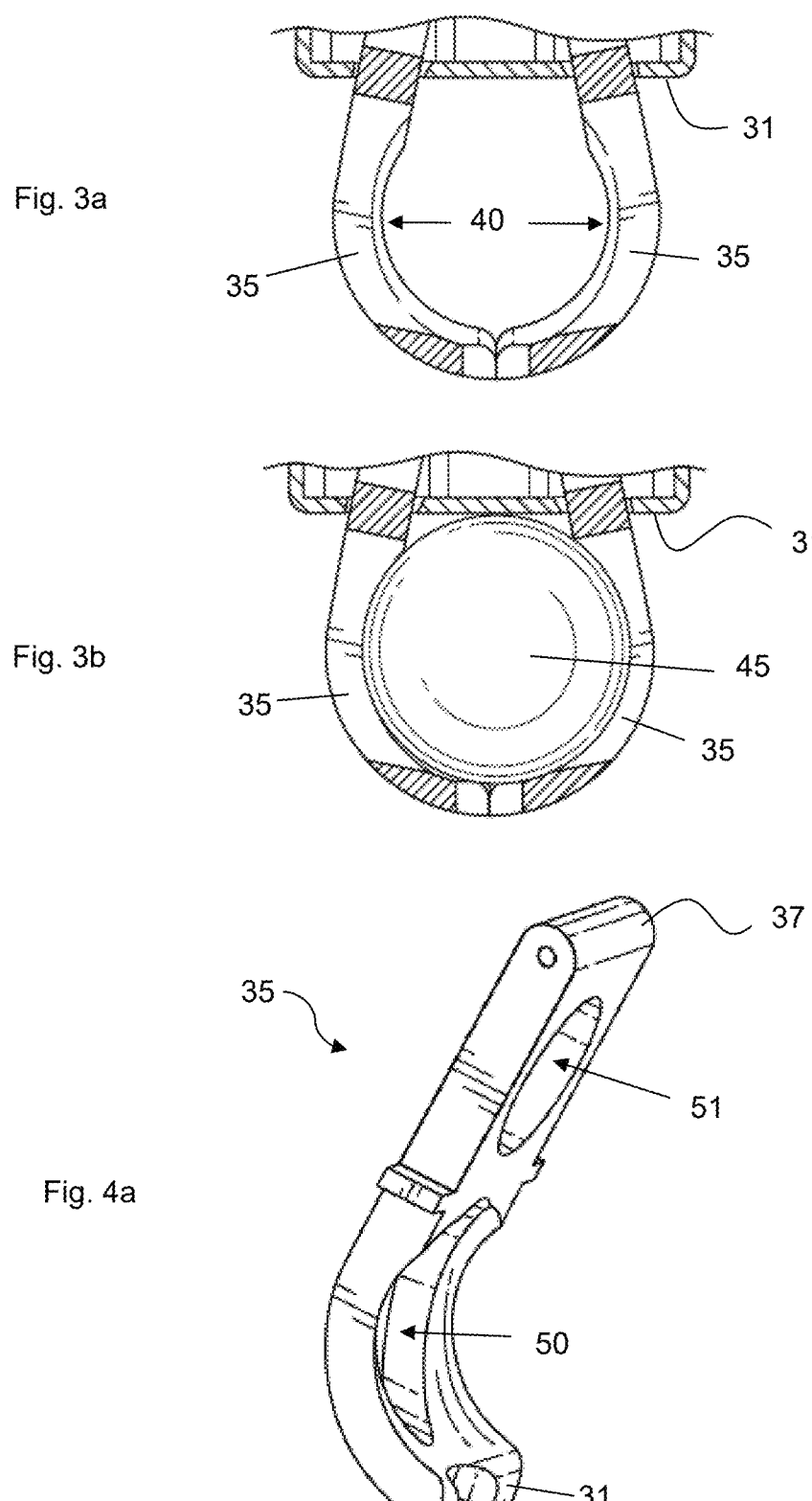
FIG. 3a is a fragmentary front plan view of a pair of device spoons in a closed configuration in accordance with some embodiments of the presently disclosed subject matter.
FIG. 3b is a front plan view of a pair of device spoons in a closed configuration grasping a golf ball in accordance with some embodiments of the presently disclosed subject matter.
FIG. 4a is a perspective view of a device spoon in accordance with some embodiments of the presently disclosed subject matter.

A pair of spoons 35 is positioned adjacent to bottom face 31 of housing 25. The spoons are movable between an open configuration as shown in FIG. 2a, in which the spoons can approach an object, and a closed configuration as shown in FIG. 2b, in which the spoons retain the object. In certain embodiments, the spoons are shaped to conform to the outer curvature of a standard golf ball such that in the closed configuration, the ball is securely cradled. For example, the interior space defined between the spoons may have a maximum diameter 40 corresponding to the outer diameter of a golf ball (approximately 1.68 inches), as illustrated in FIG. 3a. In this arrangement, the spoons fully engage ball 45 to prevent unintentional release. Further, in the closed configuration, the geometry of the spoons positions the upper surface of the ball in contact with the bottom face 31 of housing 25, as shown in FIG. 3b. Advantageously, when a tee and ball are being inserted into the ground, the insertion load is transferred through the housing rather than through the spoons, thereby preventing undesired opening or loss of control.

As shown in FIG. 4a, each spoon 35 includes lower cutout 50. When the device is in a closed configuration, spoons 35 cooperate to cradle and retain a golf ball, with the golf ball prevented from extending through the lower cutouts 50. Each lower cutout further provides a viewing aperture that permits visual confirmation of the presence and position of the golf ball during and after a grasping operation. In addition, the provision of lower cutout 50 reduces material usage, thereby decreasing the overall device weight.

Although shown as a circular cutout in FIG. 4a, it should be appreciated that the shape of lower cutout 50 can vary depending on the item to be grasped (e.g., it can be oval, circular, square, triangular, rectangular).

As shown in FIG. 4a, each spoon 35 can include one or more optional upper cutouts 51. The upper cutouts 51 reduce material usage of the corresponding spoon 35, thereby decreasing overall device weight and facilitating lighter handling. In particular, reducing the weight in portions of the device distal from the user's hand (e.g., at the spoons) reduces the effective moment of the user's arm and/or rotational inertia about the user's grip during manipulation, which makes the device feel substantially lighter and can reduce user fatigue.

Each spoon 35 includes lower end 31 and upper end 37, as shown in FIG. 4a. In some embodiments, the lower ends of spoons 35 include chamfered surfaces 38 configured to facilitate reception of a golf ball 45 into the interior cradle defined between the spoons. The chamfer forms an angled transition face between the bottom edge of the spoon and its inner surface. As the spoons are advanced toward a golf ball in the open configuration and are subsequently actuated toward the closed configuration, the chamfered surfaces act to guide the golf ball upwardly and inwardly into the concave interior of the spoons. The geometry reduces the need for precise alignment beneath the ball and allows the spoons to lift the ball from the ground with minimal resistance. Once elevated into the interior region, the ball is automatically seated within the curved gripping surfaces of the spoons, thereby ensuring proper positioning for secure retention when the spoons reach the closed configuration.

As used herein, the term "chamfer" refers to any surface treatment in which a corner or edge is cut, ground, or otherwise formed to provide an angled transitional face between adjoining surfaces. A chamfer may be linear, curved, stepped, or otherwise contoured, and may be formed at any acute or obtuse angle relative to the adjoining surfaces. In some embodiments, the chamfer is approximately 45° to the adjacent surfaces. However, the invention is not limited to any particular angle.

In addition, each spoon 35 can include indentation 39 configured to engage an elongated support member (such as a golf tee 115). The indentation is sized and positioned such that when the two spoons are in the closed configuration, the facing indentations cooperate to define a cavity that retains the golf tee. The cavity securely holds the tee in place and prevents dislodgment during use, as shown in FIG. 4b. The indentations may be dimensioned to accommodate golf tees of various sizes, and when joined, the indentations generally fit around a neck portion of the tee.

Each spoon 35 includes an upper end 37 that is coupled to a carrier 55 positioned within the interior of housing 25, as shown in FIGS. 5a and 5b. In some embodiments, the upper ends 37 of the spoons are pivotably connected to carrier 55. The pivotable connection may be formed by a pin joint, hinge, axle, or other rotational coupling that permits the spoons to swing relative to the carrier. In this arrangement, each spoon is able to rotate about its connection point between an open position (in which the lower ends of the spoons are spaced apart) and a closed position (in which the lower ends move toward one another to grasp an object). The pivotable connection allows the spoons to operate in a coordinated manner when actuated by vertical displacement of the carrier. For example, as the carrier moves upward within the housing, the spoons rotate inwardly to the closed position. Conversely, when the carrier moves downward within the housing, the spoons rotate outwardly toward the open position. The pivoting relationship between the spoons and carrier provides a controlled grasping and releasing action while maintaining the structural stability of the device.

Figure 5C:
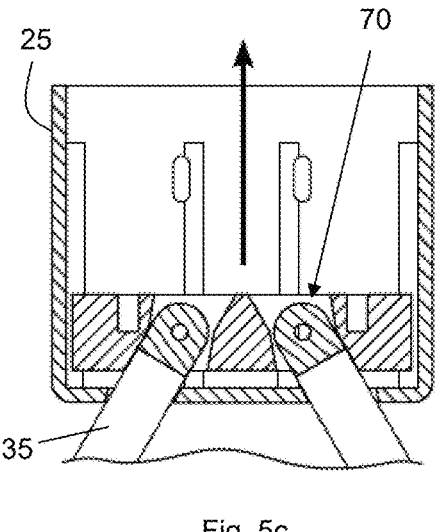
FIGS. 5c and 5d are fragmentary views of a carrier advancing upward within a housing in accordance with some embodiments of the presently disclosed subject matter.
Figure 5D:
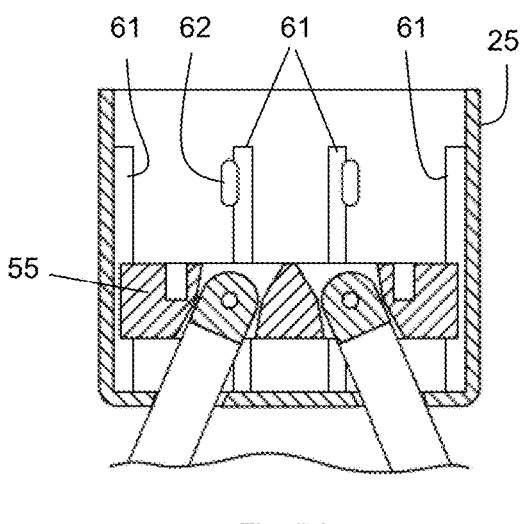
Figure 5E:
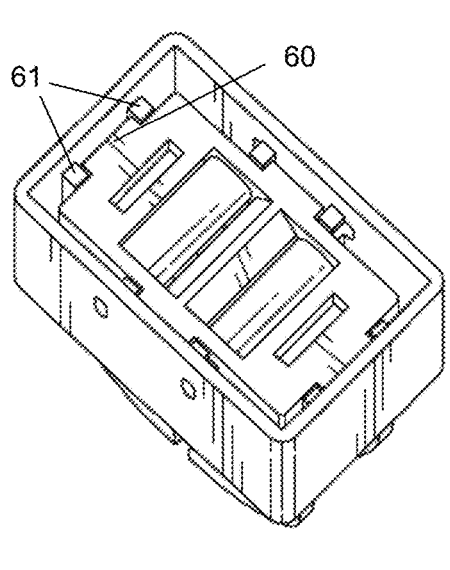
FIG. 5e is a top perspective view of a device carrier and associated spoons in a closed configuration in accordance with some embodiments of the presently disclosed subject matter.
Figure 5E:
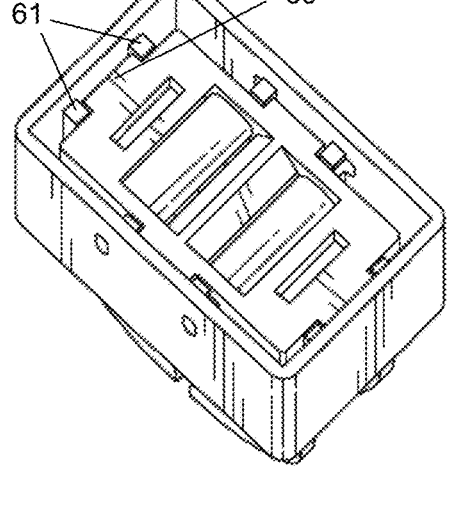
Figure 5E:
Figure 5F:
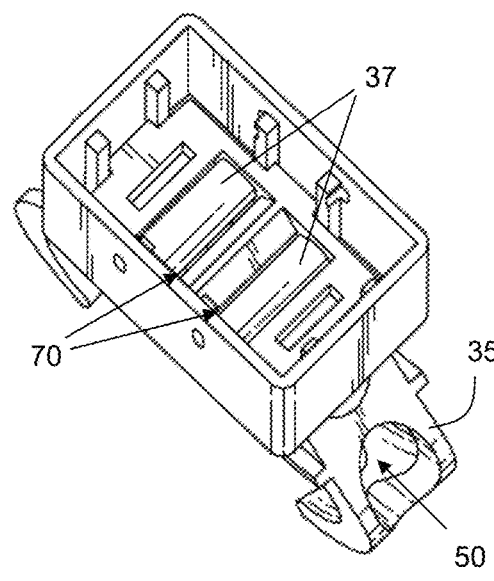
FIG. 5f is a top perspective view of the device carrier of FIG. 5e in an open configuration in accordance with some embodiments of the presently disclosed subject matter.

As noted above, the carrier is configured to move vertically within the housing along a guided path. To this end, the carrier includes opposed outer edges, each edge having an outwardly projecting ridge 60 configured to engage guide tracks formed in the interior of housing 25. The ridges 60 cooperate with the guide tracks to slidably support and direct the carrier along a vertical path of travel, as illustrated in FIGS. 5c and 5d. In some embodiments, each interior face of the housing (e.g., front, rear, left, and right walls) includes a pair of tracks 61, as shown in FIGS. 5e and 5f. The multiple track arrangement maintains the carrier in a flat and level orientation while the spoons open and close, thereby ensuring reliable engagement of an object, such as a golf ball or tee.

Vertical movement of the carrier lengthens and shortens the device, producing a grasping and releasing motion analogous to the natural movement of a hand or arm.

Figures 5G, 5H, 6:
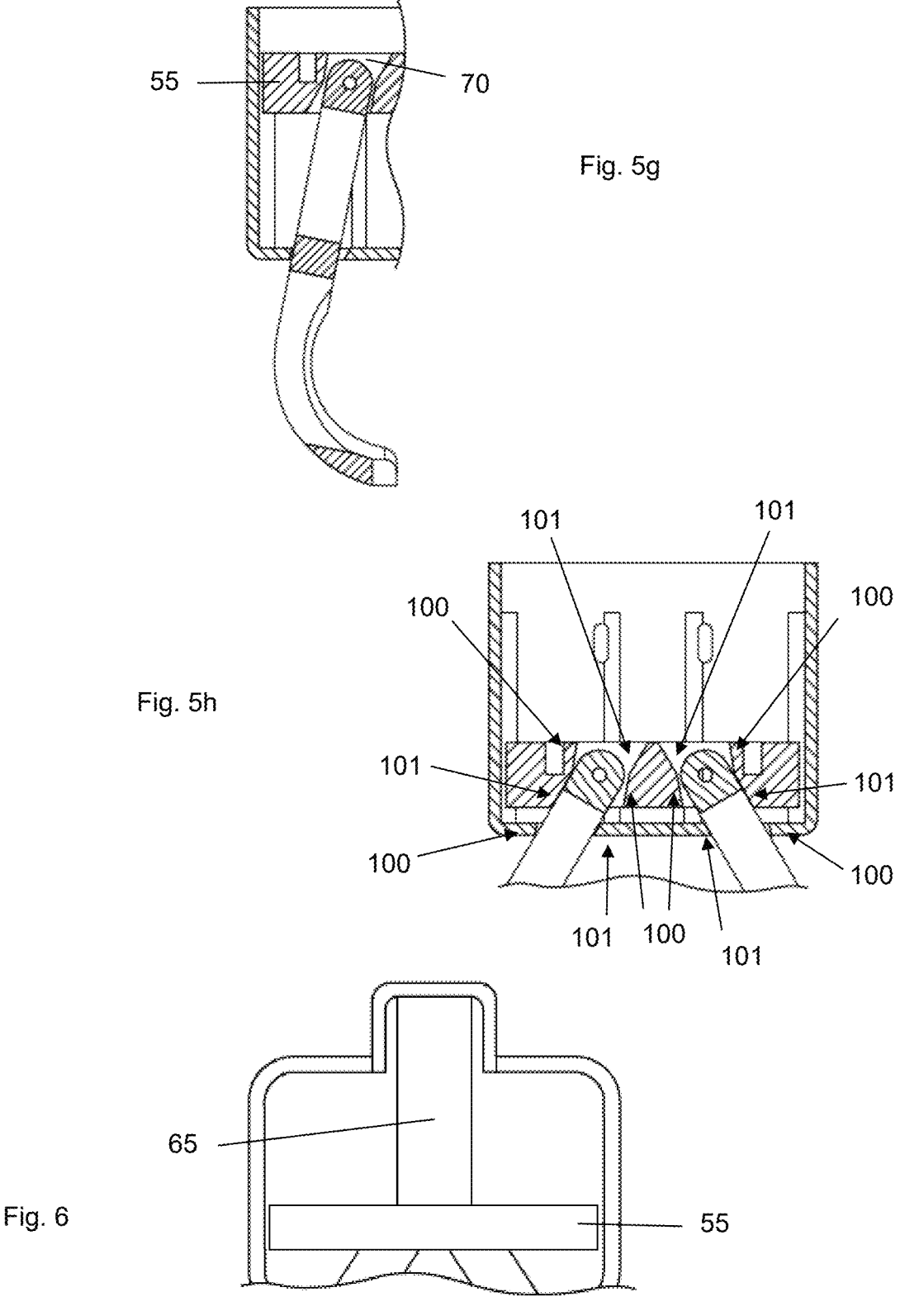
FIG. 5g is a fragmentary view of a spoon positioned within a carrier in accordance with some embodiments of the presently disclosed subject matter.
FIG. 5h is a fragmentary view of a pair of spoons positioned within a carrier in some embodiments of the presently disclosed subject matter.
FIG. 6 is a fragmentary view of a device housing comprising a spring, carrier, and spoons in accordance with some embodiments of the presently disclosed subject matter.

Carrier 55 includes cutouts 70 configured to control the range of motion of spoons 35. The cutouts define the allowable angular displacement of the spoons relative to the carrier, thereby constraining the swing or pivot permitted by the pin or other pivotable connection, as shown in FIGS. 5e-5g. The geometry of the cutouts establishes travel stops that prevent excessive outward rotation of the spoons and ensure consistent positioning during operation. In the fully opened configuration, the outer edges of the spoons engage the cutouts so that the spoons remain within a predetermined maximum separation distance. The controlled opening ensures that the spoons do not spread beyond design limits (e.g., cup size), thereby improving stability, repeatability, and safety of use.

As illustrated in FIG. 5h, each spoon is pivotably coupled at a pivot point and is actuated by cooperative interactions defined between a carrier and a housing. The housing includes a first angle 101 oriented at about 59.7° from a horizontal reference and a second angle 100 oriented at about 101° from the horizontal reference in some embodiments. Corresponding cam or follower surfaces in the carrier are oriented to match these angles so that, during operation, the spoons are governed by engagement between the carrier and housing rather than by any angles located above the spoon pivot. It should be appreciated that angles 100, 101 are representative examples only and non-limiting.

During a closing stroke (e.g., when the carrier advances to grasp), a first cam surface of the housing engages the carrier to drive rotation of the spoons toward the closed configuration. During an opening stroke (e.g., when the carrier retracts), a second cam surface of the housing engages the carrier to drive rotation of the spoons toward the open configuration. Full-open travel is limited by a defined stop condition produced by simultaneous engagement between a stop surface on the carrier and the housing cam geometry (including the first and second angles) that together establish a mechanical stop that prevents further spoon rotation.

In some embodiments, the maximum separation distance defined by the cutouts corresponds to (or is slightly less than) the sanctioned diameter of a regulation golf cup (e.g., about 4.25 inches). By maintaining the spoon span within this diameter, the device can be operated inside a golf cup without interference, while still permitting reliable grasping and releasing of a golf ball. In other embodiments, the maximum span may be set according to different application requirements, such as fitting within a container, receptacle, or other bounded space.

The interior of housing 25 includes spring 65 positioned within enclosure 26 and disposed above carrier 55, as shown in FIG. 6. The spring is oriented to exert a downward biasing force on the carrier, thereby urging the carrier toward a lowered position within the housing. In the rest condition, the downward force of the spring maintains the spoons 35 in the open configuration, such that the lower ends of the spoons are actuated outwardly. When an external force is applied to compress the spring, the carrier is displaced upwardly against the biasing force. Upward displacement of the carrier causes the pivotable connection between the carrier and spoons to actuate the spoons towards each other to grasp or retain an object. Stated another way, the geometry of the carrier cutouts forces the spoons toward each other to the closed configuration as the carrier moves upwardly in the housing interior. When the external force applied to spring 65 is released, the spring relaxes and returns the carrier to its lowered position, thereby returning the spoons to the open configuration.

In some embodiments, spring 65 can be a coil spring, leaf spring, elastomeric element, or other biasing member capable of storing and releasing energy. The enclosure 26 may be shaped to retain the spring in proper alignment relative to the carrier, and may include guide surfaces, channels, or seats to prevent lateral shifting of the spring during compression and decompression.

Figure 7A:
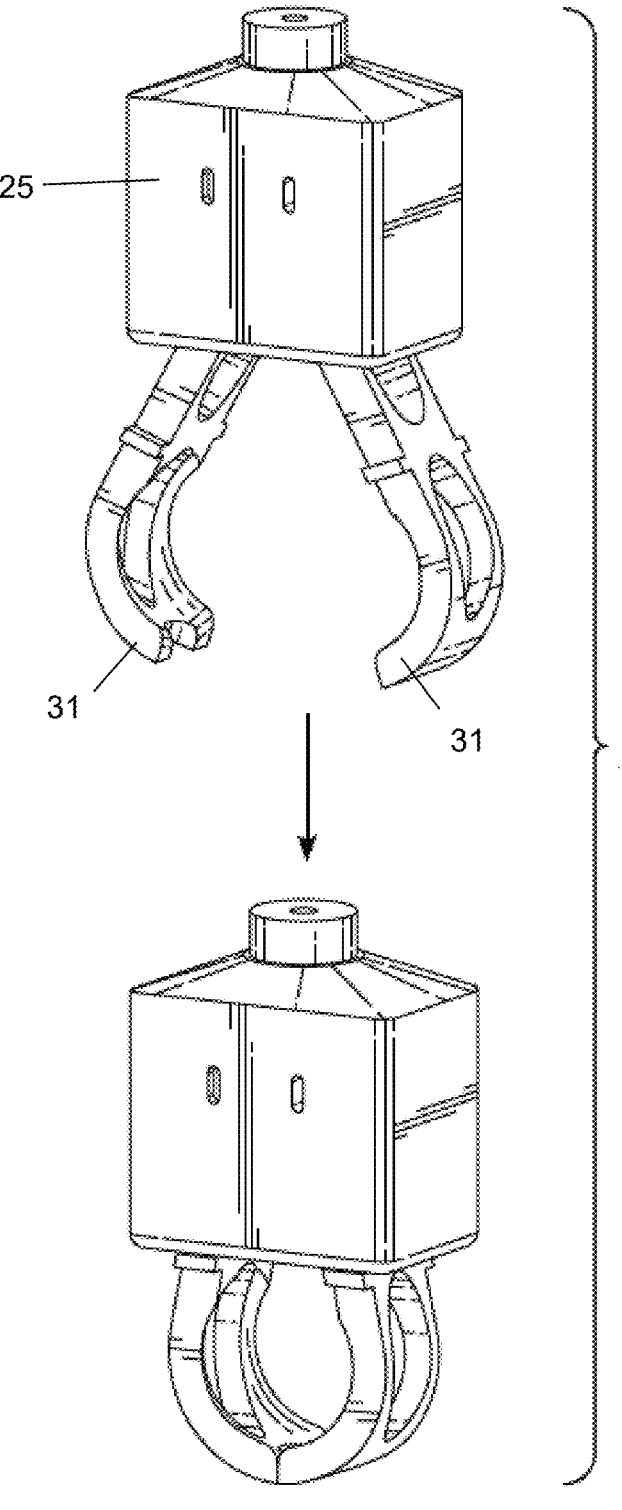
FIG. 7a is a perspective view of a device housing and associated spoons transitioning from a first, open orientation to a second, closed orientation in accordance with some embodiments of the presently disclosed subject matter.

FIG. 7a illustrates the device head in a resting orientation transitioning to an in use orientation. In the at rest state, spring 65 is in an elongated condition and applies a downward biasing force on carrier 55 within housing 25. The downward position of the carrier maintains spoons 35 in their extended and open configuration, with lower ends 31 spaced apart at a maximum separation distance.

When actuation occurs (such as when a user initiates a grasping motion), the spring is compressed and carrier 55 is displaced upwardly against the biasing force. As the carrier rises within housing 25, the pivotable connection between the carrier and spoons 35 causes the spoons to retract upwardly toward the housing, thereby shortening the effective length of the device, while simultaneously rotating inward to the closed configuration. In this position, the spoons securely grasp an object, such as a golf ball. The combined shortening and closing action simulates the natural motion of a human hand and arm during grasping, providing intuitive operation for the user.

Figure 7B:
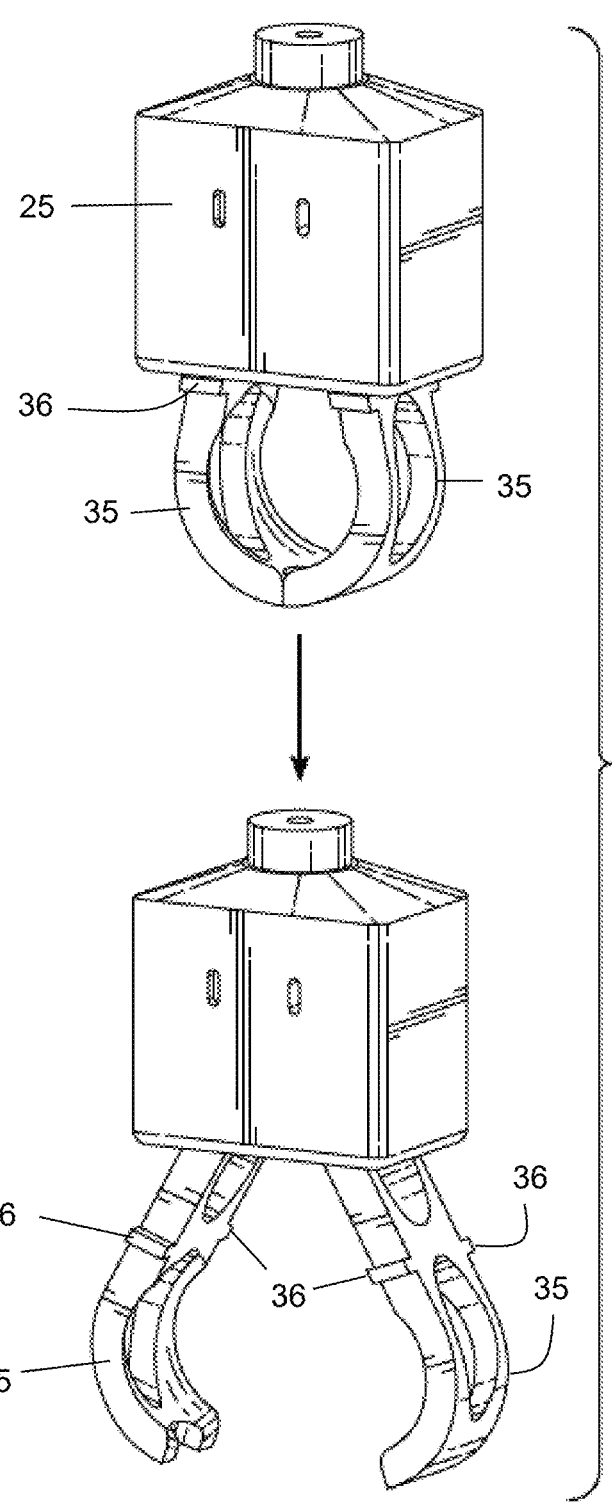
FIG. 7b is a perspective view of a device housing and associated spoons transitioning from a first, closed orientation to a second, open orientation in accordance with some embodiments of the presently disclosed subject matter.

As shown in FIG. 7b, when the actuating force is released, spring 65 expands and returns toward its elongated condition, urging carrier 55 downward within housing 25. In response, spoons 35 extend outwardly from the housing while simultaneously rotating apart into the open configuration. The dual action lengthens the device and permits an object to be received between the spoons for gripping or to be released onto a support surface.

Figure 7C:
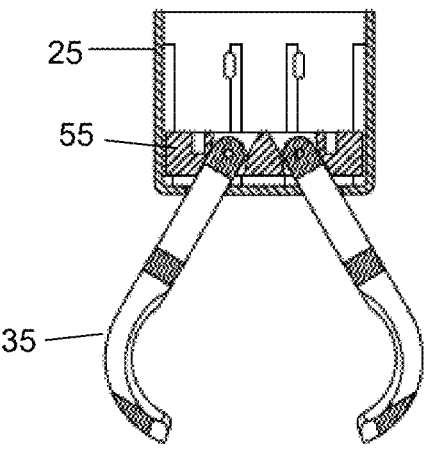
FIGS. 7c-7e are fragmentary front views of a carrier and associated spoons transitioning from a first, open orientation to a second, closed orientation in accordance with some embodiments of the presently disclosed subject matter.
Figure 7D:
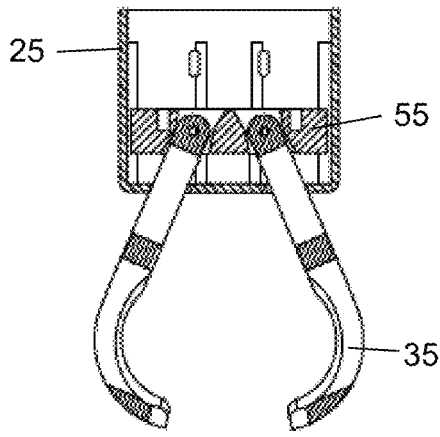
Figure 7E:
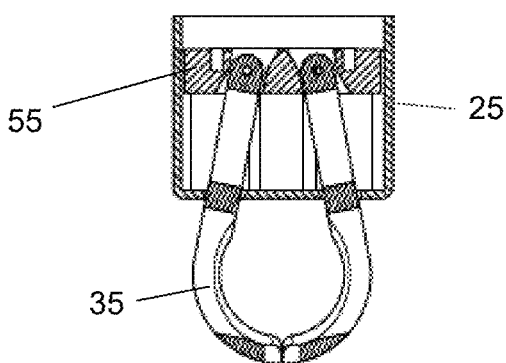
Figure 7F:
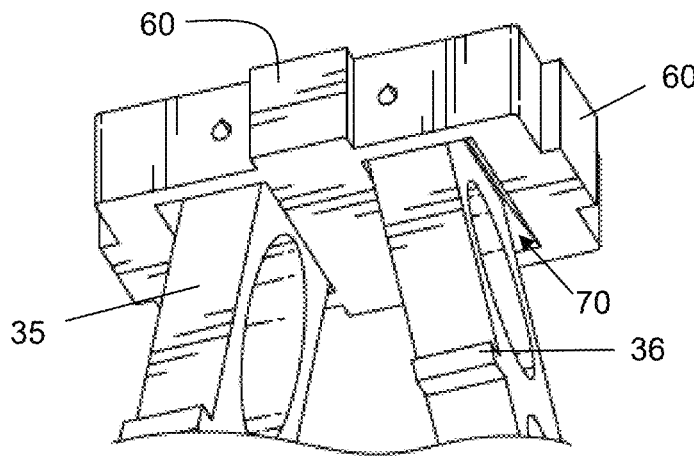
FIG. 7f is a perspective view illustrating the connection of spoons to the carrier in a closed orientation in accordance with some embodiments of the presently disclosed subject matter.
Figure 7G:
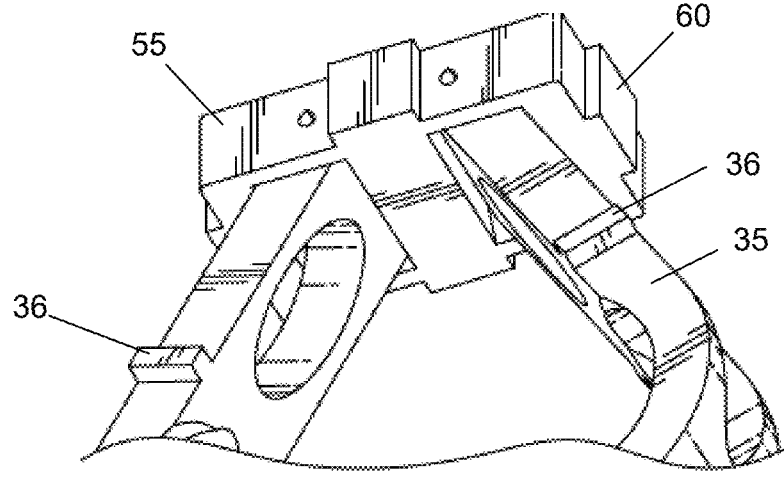
FIG. 7g is a perspective view illustrating the connection of spoons to the carrier in an open orientation in accordance with some embodiments of the presently disclosed subject matter.

FIGS. 7c-7e illustrate three representative states of the spoon assembly. Specifically, FIG. 7c depicts spoons 35 in a fully open position and FIG. 7e depicts the spoons in a fully closed position. FIG. 7d depicts an intermediate, partially retracted position. The figures demonstrate that as the spoons transition from the open state toward the closed state, the overall length of the device decreases, thereby mimicking the natural kinematics of a human arm and hand shortening during the act of grasping an object.

The relative position of the carrier pin with respect to housing 25 governs the motion of the spoons. As the pin is displaced upwardly away from the housing, cutouts 70 formed in the housing body interact with the spoons to progressively drive them toward the closed position. When the carrier is fully raised, several alignment conditions are reached simultaneously: (i) the lower ends of the spoons contact one another to establish a grasping configuration, (ii) a ball positioned between the spoons is pressed against the bottom of the housing, (iii) stop features of the spoons engage the lower portion of the housing, and (iv) the range of spoon travel is constrained by contact with the inner edge of the carrier.

It should be appreciated that each carrier cutout includes surfaces oriented at different angles. One surface engages the outer face of the spoon, while the other surface engages the inner edge. The surfaces correspond to complementary angled features of carrier 55. Specifically, the outer cutout angle correlates with the angular orientation of the spoons in the open position, while the inner cutout angle correlates with the angular orientation of the spoons in the closed position. As the carrier moves, the spoons move along the angled surfaces that mechanically guide the spoons between open and closed states in a controlled and repeatable manner.

The guided motion is advantageous during both grasping and release. For example, when placing a ball on a tee, the user withdraws the device while allowing the spoons to open. Because the device simultaneously lengthens as the spoons open, the ball remains seated on the tee. Once the spoons reach their fully open configuration, maximum clearance is created, reducing the likelihood of the spoons inadvertently striking the ball and dislodging it from the tee.

Additionally, the geometry and positioning of cutouts 70 are configured not only to produce coordinated closing of the spoons during retraction into housing 25 and opening during extension from the housing, but also to limit the range of travel of the spoons. As a result, consistent operation is ensured. In addition, overstressing of the spoon joints is prevented and a repeatable motion over multiple use cycles is achieved.

Spoons 35 include one or more stop features 36 configured to limit the extent to which the spoons withdraw into housing 25, thereby constraining both the vertical travel of carrier 55 and the upward motion of the spoons. In operation, stop 36 engages the bottom of housing 25 to define the uppermost closed position of the spoons. In this condition, the spoons are fully closed, and the top of a golf ball is positioned in direct contact with the underside of the housing, thereby facilitating accurate placement of the ball on a tee. The positioning of stop 36 also prevents over-travel of the carrier, ensuring consistent grasping performance and repeatable motion. In some embodiments, the allowable distance of carrier movement corresponds approximately to the natural range of motion of a user's index or middle finger when pulling a trigger-style actuator, thereby enhancing ergonomic comfort during operation.

Figure 8:
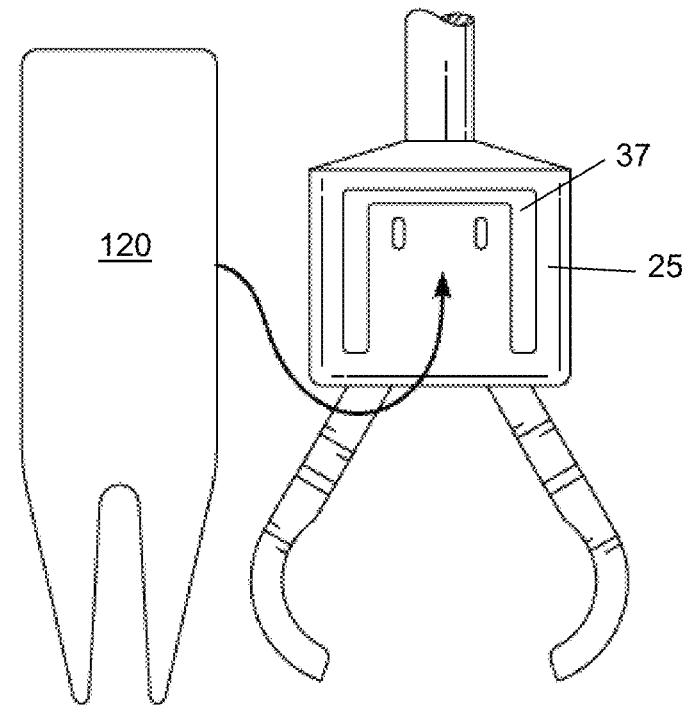
FIG. 8 is a fragmentary from view of a device comprising a releasably attachable accessory in accordance with some embodiments of the presently disclosed subject matter.

In some embodiments, the housing can further include at least one track 37 disposed along an outer edge, as shown in FIG. 8. The track is configured to retain an accessory item (such as a ball marker and/or divot repair tool 120) thereby allowing the user to conveniently pick up, carry, and/or store the accessory. Any suitable accessory can be guided along track 37 and removably retained adjacent to the device housing.

In some embodiments, the disclosed device can include one or more magnets 138 that can releasably attract one or more metallic items (e.g., a ball marker). As shown in FIG.

4*b*, magnet 138 can be positioned on one or both spoons 35, although it should be appreciated that the magnet can be positioned in any suitable orientation on the device. Any magnet can be used, including (but not limited to) permanent magnets, rare earth magnets, or ferrite magnets, provided the magnet is capable of generating sufficient attractive force to retain the selected metallic object As noted above, the disclosed device also includes triggers 20 that perform multiple functions. In one aspect, the trigger provides a location accessible to the user for actuating the head assembly and deploying the tripod mechanism. The triggers are each configured to be operated by a single finger of the user, thereby enabling one-handed operation. As a result, the user's other hand is free to use with ancillary tasks, such as holding or carrying one or more golf clubs or handling a golf ball and/or golf tee, while still actuating the device.

Another function of the triggers is to provide a comfortable engagement surface, enabling the user to actuate the spoons and/or tripod while minimizing unintended movement of the overall device. In certain embodiments, the trigger region may be incorporated into a gun-style grip 75, which allows the majority of the user's fingers to remain in contact with the device to stabilize and steady the device, while a single finger is employed to perform the actuating action. The geometry of the head assembly and tripod assembly is designed such that the stroke or pull distance required of the actuating finger corresponds to the normal range of motion comfortably achievable by a user's finger. Additionally, the spring forces associated with the head and tripod assemblies are selected to provide a resistance level that is within the range of comfortable finger actuation pressures, thereby ensuring reliable operation without undue strain on the user.

Figure 9:
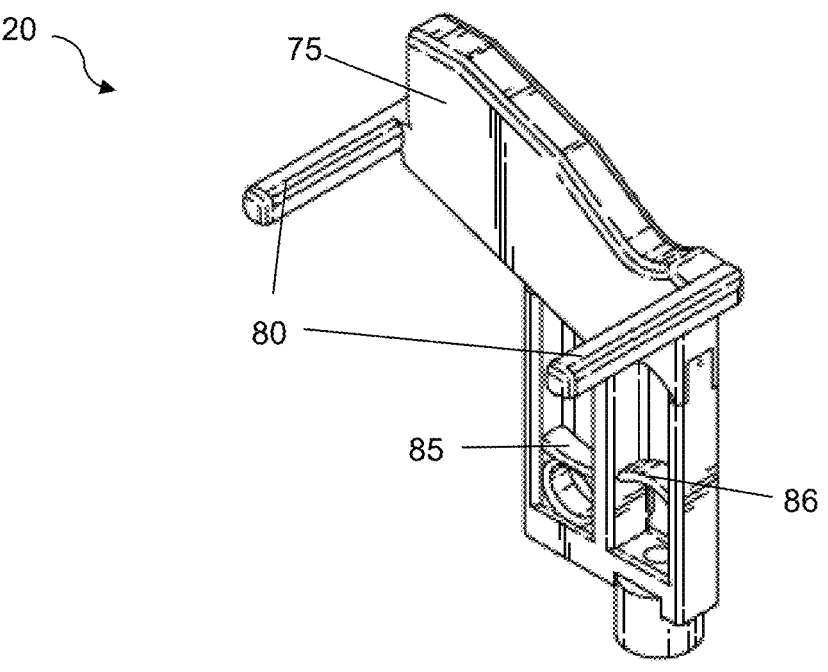
FIG. 9 is a perspective view of a device handle in accordance with some embodiments of the presently disclosed subject matter.

The trigger region may further include a handle portion sized to provide a secure grip for the user, as shown in FIG. 9. In certain embodiments, the handle is formed with one or more protrusions 80 configured to reduce the risk of golf clubs from sliding from the handle when the device is in a freestanding position. For example, when the device is supported in an upright orientation by the tripod assembly, one or more golf clubs (or any suitable item) can be leaned against the handle and the protrusions serve to inhibit unintended sliding or displacement of those items, thereby providing a support.

The trigger region may incorporate two distinct triggers 85, 86, each operable independently of the other to carry out a respective function of the device. In one embodiment, a first trigger is configured to actuate the spoons of head assembly 20, while a second trigger is configured to actuate the tripod mechanism, the independent actuation allowing the user to selectively perform either action as needed.

To actuate the spoons 35 toward a closed orientation, trigger 86 can be coupled to a biasing member (e.g., spring) and to carrier 55 via a transmission extending along the device. In one embodiment, the carrier can be coupled to a rod that extends through an aperture in an upper end cap of the housing, with the spring disposed about the rod. The rod includes a retention feature (e.g., a notch or eyelet). A flexible tensile member (e.g., a string, cord, or cable) can be secured to the retention feature, routed along the shaft, and terminated at trigger 86, for example by passing through a hole formed in the trigger and being secured thereto. Actuation of the trigger tensions the tensile member to translate the rod and carrier against the bias of the spring, thereby rotating spoons 35 to the closed orientation. When the trigger is pulled by the user, the linkage compresses spring 65 positioned at the opposite end of the device. Compression of the spring displaces carrier 55 upward within housing 25, which in turn causes spoons 35 to transition from the open configuration toward the closed configuration. In this condition, the spoons retract upwardly and rotate inwardly, thereby grasping and securing a golf ball or other object positioned between them. Release of the trigger allows the spring to return toward its elongated condition, driving the carrier downward and returning the spoons to their open configuration for receiving or releasing an object.

Figure 10A:
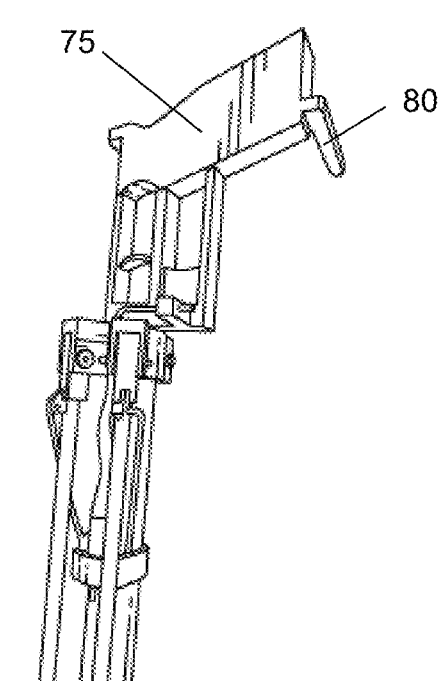
FIG. 10a is a perspective view of a device handle and tripod connection in accordance with some embodiments of the presently disclosed subject matter.
Figure 10E:
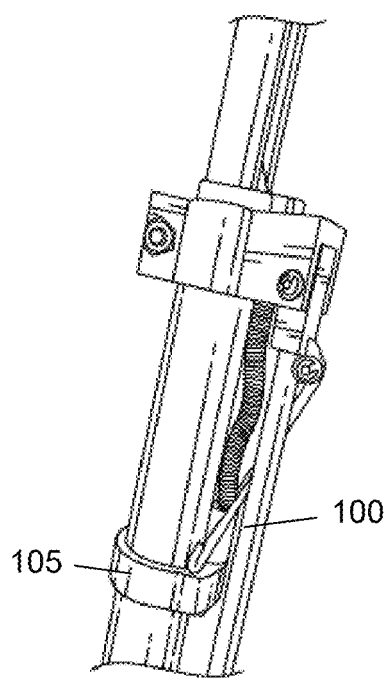
Figure 10F:
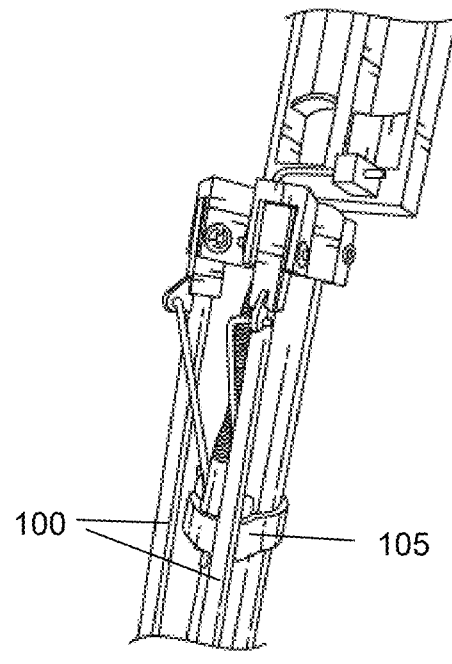

Device 5 further includes tripod 15 configured to support the device in a freestanding, upright orientation, as shown in FIGS. 10*a*-10*c*. In this position, tripod 15 is capable of bearing the weight of device 5 itself as well as supporting additional items (such as one or more golf clubs leaned against the device). The tripod enables the user to place device 5 on a substantially flat surface during play (e.g., while putting a ball or striking a shot) without requiring the device to be laid on the ground.

Tripod 15 is selectively deployable through actuation of trigger 85 located on handle 75. Upon trigger actuation, a linkage member engages and displaces a slide positioned along shaft 91. The slide is movable in a generally vertical direction between a resting position and an actuated position. A pair of linkage arms is connected to the slide, each arm operatively coupled to a corresponding tripod leg 100, as shown in FIGS. 10*c*-10*f*. As the slide is displaced upwardly against the force of a return spring, the linkage arms transmit motion to tripod legs 100, causing the legs to pivot outwardly relative to shaft 91.

The upper ends of tripod legs 100 are pivotally secured to a shaft collar 105. The geometry of collar 105 defines both the direction of pivoting and the maximum angular displacement of the tripod legs. This ensures that the legs spread to create a stable footprint, while preventing over-extension that could destabilize the device. In this manner, collar 105 governs the deployed geometry of tripod 15 and provides consistent and repeatable deployment.

When device 5 is lifted from the ground or when the trigger is released, the return spring urges the slide back toward its resting position. As the slide returns, the linkage arms pull tripod legs 100 inward toward shaft 91, thereby collapsing tripod 15 into a stowed configuration adjacent the shaft. The length and geometry of tripod legs 100 are selected such that they provide stability without interfering with the operation of spoons 35 or with actuation of other components of the device.

Device 5 can be constructed from any suitable material or combinations of materials. For example, metal (e.g., steel, aluminum, copper), polymeric materials, wood, carbon fiber materials, or combinations thereof can be used.

In use, device 5 can manipulated by handle 20 which includes a pair of triggers 85, 86, as described above. The first trigger is operatively coupled to spring 65 to control the opening and closing of spoons 35. The second trigger is operatively coupled to tripod 15 to selectively deploy or retract the tripod legs. To grasp both a golf tee and a golf ball, the device is used to grasp from the other hand of the golfer that is holding the ball and tee. Actuation of the first trigger causes compression of spring 65 and displacement of carrier 55 in an upward direction, which in turn causes spoons 35 to retract and pivot inwardly into a closed configuration. In this way, indentations 38 of the spoons securely engage the neck of the tee while the curved inner surfaces of the spoons cradle the golf ball, allowing both items to be lifted simultaneously. The user may then orient the device vertically above a desired teeing location and press downward. The tee is inserted into the ground while the golf ball remains positioned on its upper surface, as the closed configuration of spoons 35 retains the ball against the housing until release. Upon release of the first trigger, the spring expands, urging carrier 55 downward and returning the spoons to the open configuration, thereby withdrawing the spoons away from the ball and tee to complete placement without disturbing the ball. Because the top portion of the golf ball contacts the bottom surface of housing 20, when the tee is forcibly inserted into the ground, the impact travels from the ball to the housing, thereby providing stability and a reduced chance of dislodging the ball.

The same cycle can be used to retrieve objects from the playing surface. For example, pulling the first trigger allows the spoons to close around a golf tee seated in the ground, so that the tee may be lifted upward and removed. Similarly, the spoons may be closed around a golf ball to remove the ball from a golf cup or other surface without bending or stooping.

When the device is not actively in use, the second trigger may be actuated to deploy tripod 15. Tripod 15 pivots outwardly from shaft 91 to form a stable, freestanding base that supports the device in an upright orientation on a substantially flat surface. In this configuration, tripod 15 may also bear the weight of additional equipment (such as golf clubs or a flag pin) leaned against the device. When the device is lifted or the second trigger is released, tripod 15 retracts to a stowed position adjacent shaft 91.

It should be appreciated that while the present disclosure includes a discussion of the device used with golf-related applications, the invention is not limited. Instead, the disclosed device can be used to retrieve a variety of objects, such as (but not limited to) other sports balls, dog toys, children's toys, litter, bottles, cans, and the like. Any of a variety of objects can be retrieved.

The presently disclosed device offers many advantages to a user. For example, the device allows a user to perform a wide range of functions without having to bend or stoop. A user can tee a golf ball, retrieve a used golf tee, retrieve loose golf balls, retrieve dropped golf balls or tees from the ground, remove a golf ball from the cup, retrieve flags or pins from the ground, retrieve ball markers, and the like.

Device 5 is lightweight, allowing a user to have increased control and preventing fatigue during use.

The disclosed device replicates the action of a user reaching towards the ground, allowing the user to remain 2 feet or more above the ground at all times.

Advantageously, the device is configured to increase stability, thereby preventing accidental knocking of a golf ball from an associated tee, as well as other retrieval functions.

Device 5 can be operated using a single finger, further increasing stability of the device.

The motion of the device spoons mimics the action of a human hand and/or arm, thereby creating a natural movement for the user. As noted in detail above, when releasing an object, the device lengthens and the spoons open. When grasping an object, the device shortens and grasps, mimicking the kinetics of the human body.

Device 5 is self-standing, which frees both hands of the user when the device is not being actively used. In addition, the device can support other objects (e.g., golf clubs and accessories).

The device is durable, allowing for enjoyment by a user for many years.

The disclosed device can be used by any of a wide variety of users as shown in FIG. 11, ranging from children, the elderly, disabled persons, and those with a limited range of motion.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A golf positioning and retrieving device, the device comprising:

a head defined by:

a housing comprising a top face, bottom face, and an interior;

a carrier disposed within the housing interior and movable along a vertical path via one or more tracks disposed within the housing interior;

a biasing member disposed within the housing interior adjacent to the housing top face, the biasing member being deformable between a lengthened state and a shortened state along the vertical path and configured to urge the carrier toward a rest position;

a pair of opposed spoons each having an upper end coupled to the carrier and a lower end extending from the bottom face of the housing, the spoons being pivotable between an open configuration and a closed configuration to selectively grasp and release an object;

a handle coupled to the housing, the handle comprising a first trigger;

wherein actuation of the first trigger shortens the biasing member and vertically displaces the carrier within the housing to draw the upper ends of the spoons upward into the housing while pivoting the spoons toward the closed configuration, and release of the first trigger permits the biasing member to lengthen and return the carrier toward the rest position to advance the spoons downwardly from the housing while pivoting the spoons toward the open configuration;

wherein vertical displacement of the carrier both pivots and translates the spoons such that an effective length of the device shortens as the spoons close and lengthens as the spoons open, and wherein rotation of each spoon during upward and downward displacement of the carrier is provided by engagement between geometric cutouts formed in the carrier and complementary cam surfaces of the housing; and wherein in the closed configuration, an upper surface of the object is positioned in contact with the bottom face of the housing.

2. The device of claim 1, wherein the spoons include facing indentations that cooperate in the closed configuration to define a cavity for retaining a golf tee.

3. The device of claim 1, wherein the spoons include curved inner surfaces shaped to conform to an outer curvature of a golf ball.

4. The device of claim 1, wherein each spoon includes a cutout sized and shaped to accommodate a golf ball.

5. The device of claim 1, wherein at least one of the spoons includes a magnet configured to attract and retain a metallic item.

6. The device of claim 1, further comprising a tripod assembly coupled to handle and selectively deployable through actuation of a second trigger to selectively deploy and retract tripod legs.

7. The device of claim 1, wherein the carrier includes ridges configured to engage guide tracks within the housing, the guide tracks maintaining the carrier in a level orientation during movement.

8. The device of claim 1, wherein the carrier includes cutouts configured to limit angular displacement of the spoons relative to the carrier.

9. The device of claim 1, wherein the handle includes a grip portion sized to permit actuation of the first trigger by a single finger while the remaining fingers stabilize the device.

10. The device of claim 1, wherein the spoons are shaped such that, in the closed configuration, an upper surface of a golf ball engaged by the spoons is positioned in contact with a bottom face of the housing.

11. The device of claim 1, wherein the device is dimensioned and configured for use in positioning and retrieving sports balls, markers, toys, or debris.

12. A method of positioning and retrieving a golf ball and tee without bending, comprising:

actuating the first trigger of the device of claim 1 to compress the biasing member and displace the carrier within the housing, thereby retracting the spoons towards the housing and pivoting the spoons into a closed configuration to simultaneously grasp a golf ball and a golf tee;

while the golf ball is retained against the closed spoons and positioned in contact with the bottom face of the housing, pressing the device downward to position and insert the tee in the ground;

releasing the first trigger to permit the spoons to return the carrier to a lowered position, thereby advancing the spoons away from the housing and pivoting the spoons into an open configuration to release the golf ball while leaving the ball seated on the tee;

wherein upward displacement of the carrier shortens an effective length of the device as the spoons close and downward displacement of the carrier lengthens the effective length of the device as the spoons open.

13. The method of claim 12, further comprising using the spoons in the open configuration to position a golf ball between the spoons and then using the spoons in the closed configuration to remove the golf ball from a golf cup.

14. The method of claim 12, further comprising using the spoons in the closed configuration to remove a tee from the ground after striking a shot.

15. The method of claim 12, wherein the device further comprises a tripod assembly coupled to handle and selectively deployable through actuation of a second trigger to selectively deploy and retract tripod legs, and actuating the second trigger to deploy the tripod, thereby supporting the device in a freestanding upright orientation.

16. The method of claim 12, wherein actuating the first trigger comprises pulling the trigger with a single finger while stabilizing the device with remaining fingers of the same hand.

17. The method of claim 12, wherein the step of positioning the tee in the ground is performed while the carrier is restrained from further upward movement by a stop surface of the housing.

18. The method of claim 12, wherein in the closed configuration, an upper surface of a golf ball engaged by the spoons is positioned in contact with a bottom face of the housing.

19. The method of claim 12, wherein the spoons include facing indentations that cooperate in the closed configuration to define a cavity for retaining a golf tee.

20. The method of claim 12, wherein the spoons include curved inner surfaces shaped to conform to an outer curvature of a golf ball.

\* \* \* \* \*